Sept. 23, 1924.

H. D. BERNSTEIN

FILM AND PLATE HOLDER

Filed Dec. 7, 1923

WITNESSES:
Cris Feinle
E. L. Mueller

INVENTOR,
Harold D. Bernstein.
BY Munn & Co
ATTORNEYS

Sept. 23, 1924.  H. D. BERNSTEIN  1,509,701
FILM AND PLATE HOLDER
Filed Dec. 7, 1923   2 Sheets-Sheet 2

WITNESSES:

INVENTOR,
Harold D. Bernstein.
BY
ATTORNEYS.

Patented Sept. 23, 1924.

1,509,701

UNITED STATES PATENT OFFICE.

HAROLD D. BERNSTEIN, OF NEW YORK, N. Y.

FILM AND PLATE HOLDER.

Application filed December 7, 1923. Serial No. 679,189.

*To all whom it may concern:*

Be it known that I, HAROLD D. BERNSTEIN, a citizen of the United States, and a resident of the city of New York, borough of Manhattan, in the county and State of New York, have invented a new and Improved Film and Plate Holder, of which the following is a full, clear, and exact description.

This invention relates to improvements in photographic apparatus and has particular reference to a holder for cut film sheets or plates.

An object of the invention is to provide an improved holder of simple and inexpensive construction in which a plurality of film sheets or plates may be securely maintained in the holder while being subjected to the various stages of the development process.

Another object is to mount the films or plates between a plurality of separators in such manner that the films or plates will be maintained in spaced relation to each other with a minimum portion of each of them engaged by adjacent separators.

The above and other objects will appear more clearly from the following detailed description when taken in connection with the accompanying drawings which illustrate a preferred embodiment of the inventive idea.

In the drawings—

Figure 1:
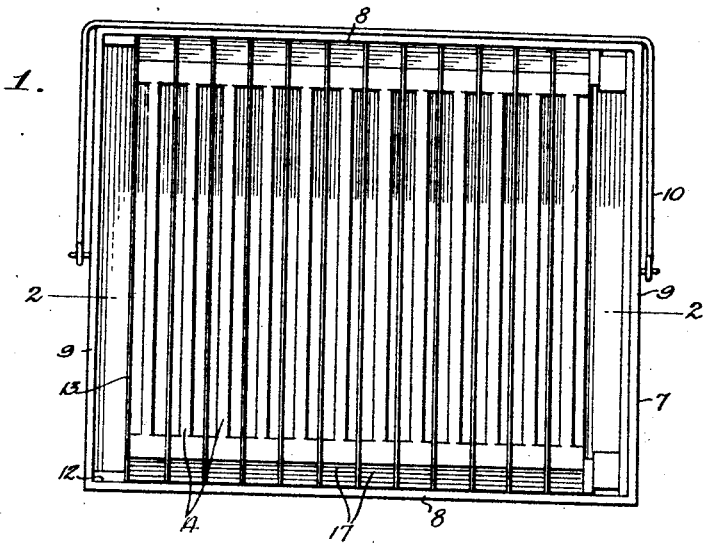
Figure 1 is a top plan view of the holder constructed in accordance with the invention.
Figure 2:
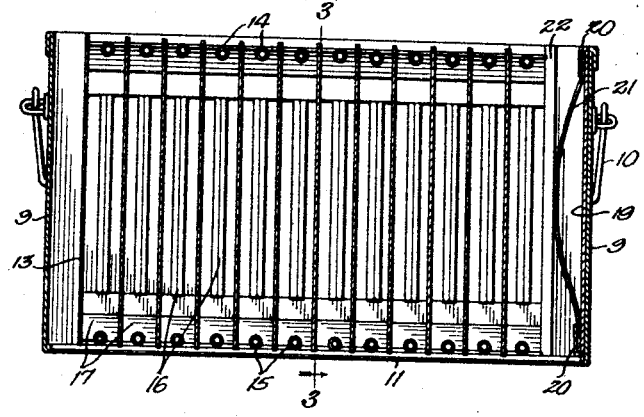
Fig. 2 is a longitudinal section on the line 2—2 of Fig. 1.
Figure 3:
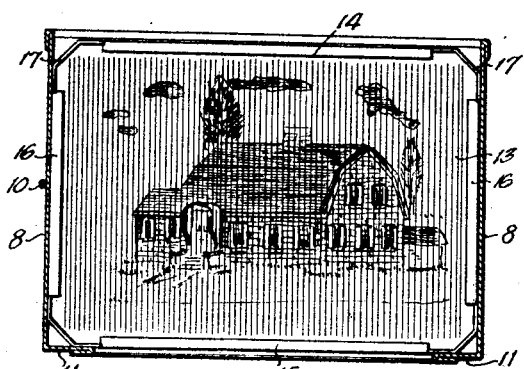
Fig. 3 is a transverse section on the line 3—3 of Fig. 2.

The accompanying drawings show the invention as comprising a casing or receptacle 7 of rectangular formation, which may be made of any suitable material, such as metal, and which includes sides 8 and ends 9. A bail or handle 10 is pivotally connected to the ends 9 of the casing to permit of the same being conveniently handled during the various steps in the process of developing the sensitized sheets which are held within the holder. The sides 8 of the casing are provided along their lower longitudinal edges with inturned flanges 11 which form the bottom of the casing and upon which the various separators are supported. At one end of the casing the sides thereof have secured thereto in any preferred manner vertically arranged spacing strips 12 (see Fig. 1) against which one of the films or plates 13 is engaged preparatory to its being secured within the holder for development. When placing each film 13 within the holder, the bottom edge thereof may also be engaged with the flange 11 so that the films will be evenly arranged in the casing.

Figure 4:
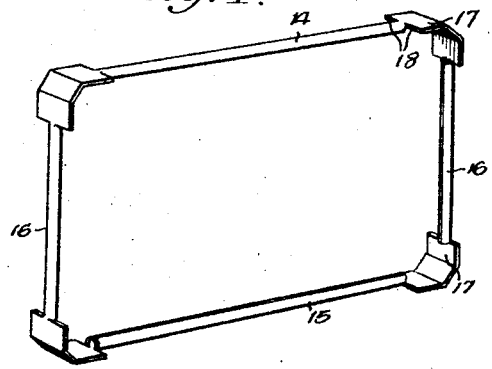
Fig. 4 is a perspective view of one of the separators employed in connection with the invention.

After the first film has been placed in position in engagement with the strips 12, one of the separators shown in Fig. 4 is then placed within the casing so as to properly engage the film and retain the same in position for development. Each of the separators shown in Fig. 4 is preferably formed from a single length of material which is cut to provide the upper and lower sides 14 and 15 and the ends 16. To form the sides and ends the material of which the separator is made is cut transversely adjacent the corner portions 17 thereof, as indicated at 18, and the material of said sides and ends is then rolled substantially into tubular form so that the width of said sides and ends will be considerably less than that of said corner portions 17. Each corner portion 17 presents relatively sharp edges which are designed to engage the corners of the films or plates interposed between adjacent separators. The sides and ends being of less width than the corner portions, it will be obvious that only a very small portion of a film or plate will be engaged by the separator when the parts are in position. It is believed to be apparent that by forming the separator of a single length of material the same need not necessarily be cut transversely adjacent the corners, as at 18, but may be cut at any point about the periphery of the separator to form transversely disposed portions similar to the corner portions 17, which may be utilized to engage the film or plate.

Figure 5:
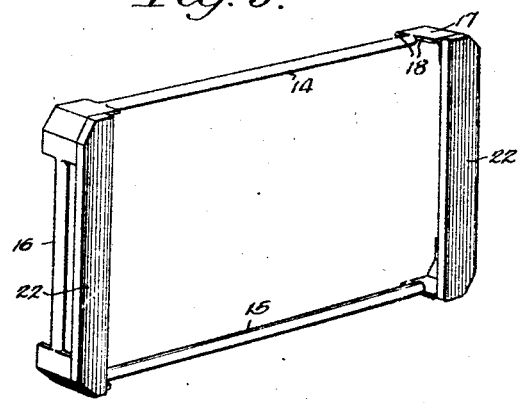
Fig. 5 is a similar view of an end separator.
Figure 6:
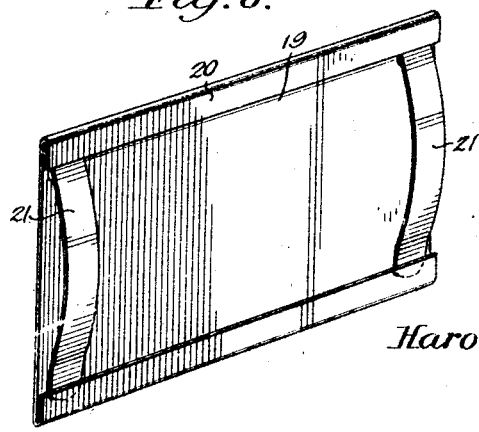
Fig. 6 is a similar view of a retaining member which co-operates with the separator shown in Fig. 5 to retain the separators in proper position within the holder.

Following the insertion of the first separator into the casing and its engagement with the bottom flanges 11 and the film which has been placed in the casing, another film is placed in an upright position in engagement with the adjacent edges of the transverse corner portions 17 of said separator, and this operation is continued until the last film is placed in position. The separator shown in Fig. 5 is then introduced into the casing in the same manner as described in connection with the other separators; and after this last separator has been properly positioned, a space is left at one end of the casing into which a retaining member 19 is then inserted. This retaining member is preferably formed from a single sheet of material having its upper and lower longitudinal edges bent upon themselves, as indicated at 20, to secure therebetween the ends of bowed leaf springs 21 arranged at the ends of the retaining member. The intermediate portions of these leaf springs engage strips 22 joining the corner portions 17 of the last separator on one side thereof and extending longitudinally of the ends 16 of said separator. When thus engaged the leaf springs 21 exert a pressure upon the last separator, which pressure is in turn transmitted to the remaining separators and the films or plates interposed therebetween so that the various parts will be securely maintained in position in the casing while the sensitized sheets are being developed.

I claim:

1. In a holder for sensitized sheets, a casing, a plurality of separators insertable into said casing and between which the sensitized sheets are mounted and held in spaced relation with respect to each other by said separators, and a retaining member insertable between one end of said casing and an adjacent separator and exerting a yieldable pressure upon said separator to retain the separators and sensitized sheets in position in the casing.

2. In a holder for sensitized sheets, a casing, a plurality of separators insertable into said casing and between which the sensitized sheets are mounted and held in spaced relation with respect to each other by said separators, and a retaining element capable of being positioned in said casing between a portion thereof and one of said separators and including spring members engageable with the separator to exert a yieldable pressure.

3. In a holder for sensitized sheets, a casing including sides and ends and inturned flanges arranged along the lower edges of said sides, spacing elements disposed at one end of said casing and capable of being engaged by a sensitized sheet to space said sheet from the adjacent end of said casing, a plurality of separators insertable into said casing and engageable with said flanges to support the separators in position, adjacent separators being capable of receiving sensitized sheets therebetween to maintain said sheets in spaced relation to each other, and a retaining member introduced into the casing between one of said separators and the end of the casing opposite said retaining strips and including means engageable with said separator for exerting a yieldable pressure thereon to retain the separators in position in the casing.

4. In a holder for sensitized sheets, a casing and a plurality of separators insertable into said casing and capable of having sensitized sheets introduced therebetween to maintain said sheets in spaced relation to each other, each of said separators including portions engageable with adjacent sheets and of greater width than the remaining portions of the separator.

5. In a holder for sensitized sheets, a casing and a plurality of separators insertable into said casing and capable of having sensitized sheets introduced therebetween to maintain said sheets in spaced relation to each other, each of said separators being formed of a single length of material cut transversely to form sheet-engaging portions, the material between said portions being bent so as to be of less width than said portions so that only the edges of said portions will engage said sheets.

6. In a holder for sensitized sheets, a casing and a plurality of separators insertable into said casing and capable of having sensitized sheets introduced therebetween to maintain said sheets in spaced relation to each other, each of said separators being formed from a single length of material and bent to provide a frame including sides and ends, the material being cut transversely adjacent the extremities of said sides and ends to form corner portions of greater width than said sides and ends, the edges of said corner portions being engageable with sensitized sheets which are spaced from said sides and ends by said edges.

7. In a holder for sensitized sheets, a casing, a plurality of separators insertable into said casing and between adjacent ones of which the sensitized sheets are mounted and held in spaced relation with respect to each other by said separators when inserted in the casing.

HAROLD D. BERNSTEIN.